United States Patent [19]

Reneau

[11] 4,298,884
[45] Nov. 3, 1981

[54] CHROMA AMPLIFIER AND COLOR KILLER

[75] Inventor: Daniel L. Reneau, Elmhurst, Ill.

[73] Assignee: Zenith Radio Corporation, Glenview, Ill.

[21] Appl. No.: 135,947

[22] Filed: Mar. 31, 1980

[51] Int. Cl.³ .............................................. H04N 9/49
[52] U.S. Cl. .................................................... 358/26
[58] Field of Search ............................. 358/40, 26, 27

[56] References Cited

U.S. PATENT DOCUMENTS 3,730,978  5/1973  Wakai et al. ........................ 358/26
3,772,463  11/1973 Wakai et al. ........................ 358/26

Primary Examiner—Richard Murray
Attorney, Agent, or Firm—John H. Coult

[57] ABSTRACT

A chroma amplifier and color killer are described for use in a color television receiver. In a preferred embodiment, the chroma amplifier comprises a first pair of emitter-coupled transistors receiving a current source which has a D.C. operating component and an A.C. chroma signal component. A second pair of emitter-coupled transistors receives another current source which has only a D.C. operating component substantially equal to that received by the first pair of transistors. A variable ACC voltage and a substantially fixed bias voltage are applied to selected base terminals of the transistors such that one of the first pairs of transistors develops a gain controlled A.C. chroma signal output and one of the second pair of transistors develops an ACC-varied D.C. output signal free of chroma component. The latter signal drives a low power color killer for quenching color reproduction when the color component of the broadcast signal is missing or is of very low amplitude.

10 Claims, 3 Drawing Figures

CHROMA AMPLIFIER AND COLOR KILLER

BACKGROUND OF THE INVENTION

This invention is directed generally to improvements in color television receivers, and particularly to an improved chroma amplifier and color killer for use in such a receiver.

Color television receivers generally include a chroma amplifier for amplifying the color components of a composite video signal. Typically, the chroma amplifier is in the form of a differential amplifier whose gain is varied by an ACC (automatic color level control) voltage for holding substantially constant the peak-to-peak amplitude of the chroma amplifier's output signal.

As the gain of the amplifier is varied by the ACC voltage, a varying D.C. voltage is developed across the amplifier's load, thereby generating a D.C. voltage, usually superimposed on the amplified chroma signal, which is indicative of the gain at which the chroma amplifier is operating. That D.C. voltage is filtered to remove the A.C. chroma signal, and the filtered D.C. signal is used to operate a color killer.

Although such chroma amplifiers perform reasonably well, their drawback is the need for a filter capacitor to remove the chroma signal from the D.C. voltage used for color killer actuation. Although the inclusion of a filter capacitor increases the cost of the amplifier, the more serious problem is that the capacitor requires an extra pin on an integrated circuit in which the chroma amplifier is frequently built.

Another problem is associated with some prior color killers. The killer voltage described above usually increases as the gain of the chroma amplifier increases. At some point near maximum gain, the killer voltage is expected to be of a predetermined value which is designed to actuate the color killer. At that point, the killer voltage may be near the circuit's supply voltage, thereby leaving little tolerance for variation in the point where color is to be killed.

Further, chroma amplifiers which develop the above-described type of killer voltage frequently need a relatively large load resistor across which the color killer voltage is developed because the color killer current has a low amplitude as the kill point is approached. The large value load resistor necessarily results in a large color killer gain. Consequently, any noise present in the chroma amplifier tends to be unduly amplified in the killer voltage.

The problems mentioned above and other problems associated with prior chroma amplifiers has rendered their performance less than perfectly satisfactory, particularly with respect to their construction in integrated circuit form.

OBJECTS OF THE INVENTION

It is a general object of the invention to provide an improved chroma amplifier and color killer for use in a color television receiver.

It is a more specific object of the invention to provide a low noise chroma amplifier which develops a D.C. color killer voltage having minimal A.C. components, and an improved color killer for operation therewith.

It is another object of the invention to provide such a chroma amplifier and color killer which are readily constructed in integrated circuit form.

BRIEF DESCRIPTION OF THE FIGURES

The objects stated above and other objects of the invention are more particularly set forth in the following detailed description and in the accompanying drawings of which.

DESCRIPTION OF THE PREFERRED EMBODIMENT

Figure 1:
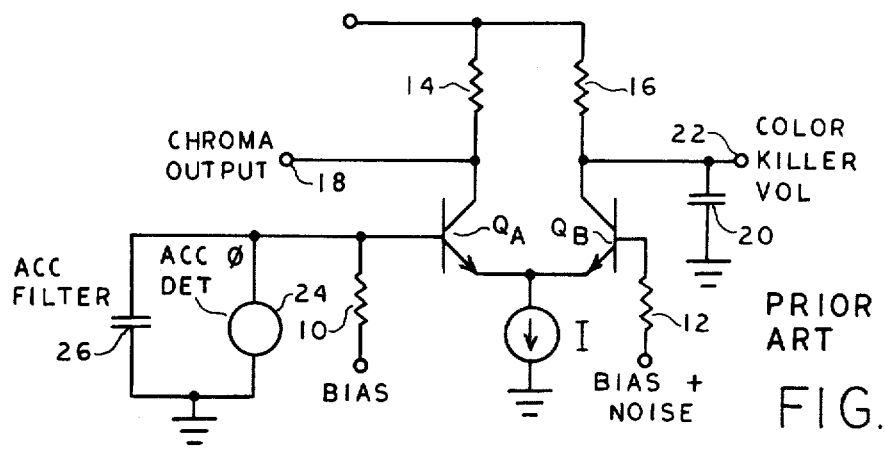
FIG. 1 illustrates a conventional chroma amplifier.

Referring to FIG. 1, a coventional chroma amplifier is shown to more clearly describe the above-stated drawbacks of the prior art.

As shown, the amplifier comprises a pair of transistors $Q_a$ and $Q_b$ connected in a differential amplifier configuration. The emitters of transistors $Q_a$ and $Q_b$ receive a source current I which includes a D.C. operating current and an A.C. chroma signal current.

To bias the transistors $Q_a$ and $Q_b$ in a conductive mode, a resistor 10 couples the base of the transistor $Q_a$ to a D.C bias source and another resistor 12 couples the base of transistor $Q_b$ to a similar D.C. bias source.

When the transistors $Q_a$ and $Q_b$ are conductive, amplified chroma signals appear across load resistors 14 and 16. The chroma signal developed across the resistor 14 is typically coupled to an output terminal 18 for further amplification.

The amplified chroma signal appearing across the resistor 16 is filtered by a grounded capacitor 20, leaving but a D.C. voltage at the collector of transistor $Q_b$ which varies in accordance with the level of conduction of the transistor $Q_b$. The level of that filtered D.C. voltage indicates the gain at which the transistor $Q_A$ is operating and is coupled to an output terminal 22 for use as a color killer voltage.

To control the gain of the transistor $Q_a$, its base receives an ACC voltage developed by an ACC phase detector 24. Conventionally, the detector 24 generates a D.C. voltage whose amplitude varies in accordance with the amplitude of the 3.58 $MH_z$ burst signal which is received as a part of the composite broadcast signal. As the level of the burst signal decreases, the detector 24 generates a voltage which increases the conduction level and gain of the transistor $Q_b$ in order to hold substantially constant the amplitude of the chroma signal at terminal 18.

Of course, as the conduction level of transistor $Q_a$ increases, the conduction level of the transistor $Q_b$ decreases. The resultant D.C. voltage at terminal 22 is indicative of this change in conduction levels.

Referring again to the phase detector 24, it normally includes a filter, represented by a capacitor 26, to remove higher frequency A.C. components of its output signal. Thus, any noise present in the voltage applied to the base of the transistor $Q_a$ is coupled to ground by the capacitor 26.

However, the base of the transistor $Q_b$ is not coupled to a corresponding filter capacitor. Hence, any noise present in the bias supply, or noise picked up on a lead coupling the bias supply to the base of transistor $Q_b$, is treated as differential noise rather than common mode noise and appears in amplified form at the output terminal 18. Hence, the amplified chroma signal may include an undesirable amount of noise.

An additional drawback of the amplifier shown in FIG. 1 is that a capacitor is required at the output terminal 20 to remove A.C. components from the D.C. color killer voltage. This is particularly troublesome where the chroma amplifier and the color killer are to be constructed on a single integrated circuit chip because an output pin from the chip is needed for access to the capacitor.

Moreover, because the signal at the chroma output terminal 18 includes a D.C. component which varies with variations in conduction of the transistor $Q_a$, it is difficult to D.C. couple the terminal 18 to a further stage of chroma amplification.

In addition, as the gain of transistor $Q_a$ increases, the amplitude of the color killer voltage at terminal 22 also increases. As stated above, it is preferable for the color killer voltage to decrease as the gain of the chroma amplifier increases.

Figure 2:
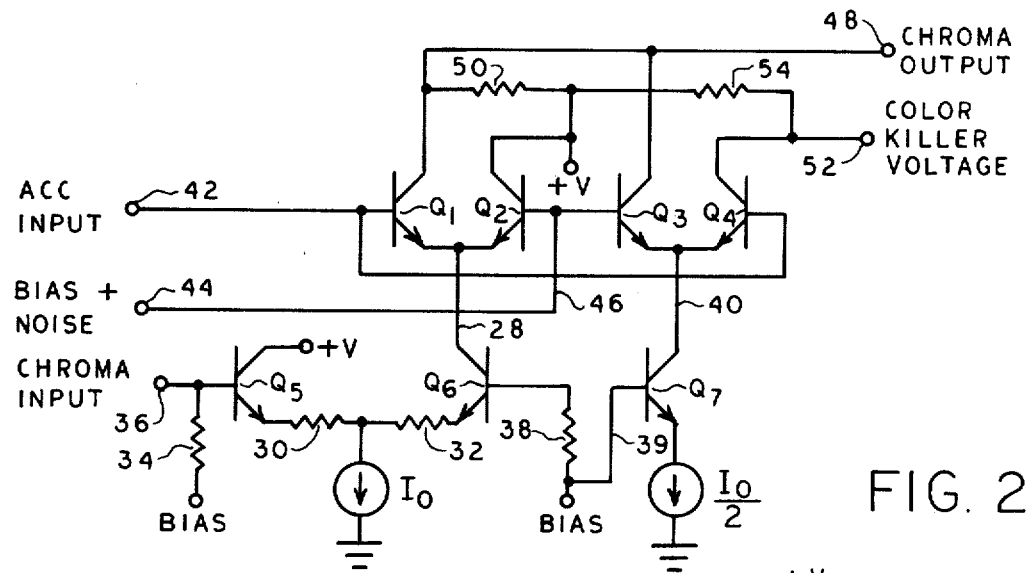
FIG. 2 is a circuit diagram of a chroma amplifier embodying various aspects of the invention.

Referring now to FIG. 2, a preferred embodiment of a chroma amplifier is shown which overcomes the problems mentioned above. The illustrated embodiment includes first and second emitter-coupled transistors $Q_1$ and $Q_2$, operating as a first differential amplifier, and third and fourth emitter-coupled transistors $Q_3$ and $Q_4$, operating as a second differential amplifier. The transistors $Q_1$ and $Q_2$ receive a source current via a lead 28, which current includes an A.C. chroma signal current to be amplified and a D.C. operating current.

The source current in lead 28 is developed by another differential amplifier comprising transistors $Q_5$ and $Q_6$. The emitters of transistors $Q_5$ and $Q_6$ are coupled through resistors 30 and 32 to a source of D.C. current $I_o$. The base of the transistor $Q_5$ receives a D.C. bias voltage via resistor 34 and an A.C. chroma input signal from terminal 36. A similar source of D.C. bias is coupled to the base of transistor $Q_6$ via a resistor 38. In this arrangement, the transistors $Q_5$ and $Q_6$ conduct equally to establish in the lead 28 a current whose D.C. component is equal to one-half the amplitude of the D.C. current $I_o$ and whose A.C. component is the chroma signal.

The transistors $Q_3$ and $Q_4$ receive their own source current via a lead 40, which current includes only a D.C. component, the amplitude of which is caused to be substantially equal to the amplitude of the D.C. component of the current in lead 28, that is, one-half $I_o$.

To develop the latter current, a transistor $Q_7$ receives a base bias voltage via a lead 39 and, at its emitter, a D.C. source current whose amplitude is one-half $I_o$. Thus, source currents whose D.C. components are substantially equal to each other flow in the leads 28 and 40.

To control the conduction levels of the transistors $Q_1$–$Q_4$, the bases of transistors $Q_1$ and $Q_4$ are coupled via terminal 42 to a source of ACC voltage which may be generated by a conventional ACC phase detector. As stated above, such detectors conventionally include capacitors for filtering high frequency components and noise from the ACC voltage. Hence, the voltage applied to the bases of transistors $Q_1$ and $Q_4$ is substantially free of noise.

Bias voltage for the transistors $Q_2$ and $Q_3$ is received at a terminal 44 and is coupled to the bases of those transistors by a lead 46. Because the lead 46 is not filtered by a capacitor, the bias voltage it carries may include noise generated by the source of bias voltage or noise picked up from other sources in the receiver. However, the illustrated embodiment operates to cancel such noise from the amplified chroma signal developed at terminal 48, as described below.

As shown, the collectors of transistors $Q_1$ and $Q_3$ are coupled together and to a common load resistor 50. Because of the differential amplifier operation of transistor pairs $Q_1$–$Q_4$, the transistors $Q_1$ and $Q_3$ react to noise on the lead 46 by developing amplified noise of opposite, cancelling polarities across the resistor 50. Moreover, because transistors $Q_1$ and $Q_3$ change their conduction levels substantially equally but in opposite directions in response to variations in the ACC voltage, no net D.C. change of a substantial amount occurs across the resistor 50. Hence, the signal at output terminal 48 constitutes an A.C. chroma signal which is amplified by the transistor $Q_1$ in accordance with the level of the ACC signal, but which contains substantially no noise from the bias source and a substantially constant D.C. level. Because the D.C. level of the signal at terminal 48 remains substantially constant as the gain of transistor $Q_1$ changes, the terminal 48 may be D.C. coupled to a further stage of chroma amplification or other signal processing circuitry.

The color killer voltage generated by the chroma amplifier appears at an output terminal 52 and, because of the illustrated arrangement, does not include any substantial A.C. component which requires removal by filtering. This result is obtained because the source current applied to transistors $Q_3$ and $Q_4$ via lead 40 contains no A.C. component. And because the base of transistor $Q_4$ receives the ACC voltage while the base of transistor $Q_3$ receives a substantially constant level D.C. bias voltage, the collector current of transistor $Q_4$ increases and decreases with corresponding changes in the level of the ACC voltage. Thus, the collector current of the transistor $Q_4$ develops across a load resistor 54 a D.C. voltage having substantially no A.C. chroma component, which voltage varies with the ACC voltage and whose level is indicative of the gain of the transistor $Q_1$. The color killer voltage at terminal 52 need not be filtered before application to a D.C. actuated color killer.

Another desirable feature of the way in which the color killer voltage is developed is that increases in chroma gain of the chroma amplifier result in a decreasing color killer voltage. This results in the illustrated embodiment from the fact that increases in the ACC voltage (resulting in increased chroma gain in transistor $Q_1$) cause an increase in the collector current of the transistor $Q_4$ and a corresponding decrease in its collector voltage.

It will be appreciated, therefore, that the chroma amplifier depicted in FIG. 2 provides a number of benefits, among which are an ACC controlled chroma signal whose D.C. level remains substantially constant and which is relatively free of noise, and a color killer voltage which requires no filter capacitor and which decreases with increases in gain of the chroma amplifier. In addition, the design of the chroma amplifier is well suited for construction on an integrated circuit chip.

Figure 3:
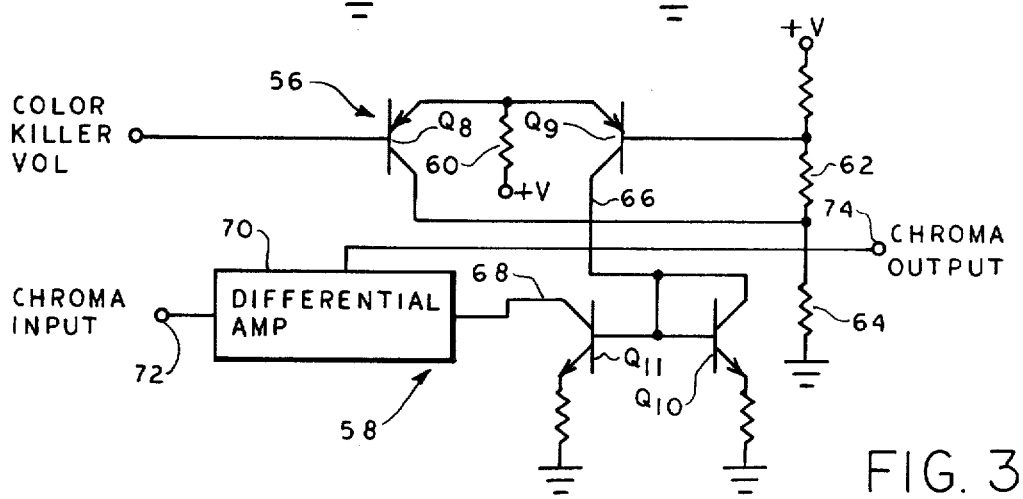
FIG. 3 is a circuit diagram of a color killer embodying further aspects of the invention.

Referring now to FIG. 3, a color killer circuit 56 is shown which is responsive to the color killer voltage generated by the chroma amplifier of FIG. 2 for turning off a further chroma amplifier 58. The illustrated color killer includes a pair of emitter-coupled PNP transistors $Q_8$ and $Q_9$ whose emitters are coupled to a source of positive potential via a common resistor 60. The base of the transistor $Q_9$ is coupled via resistors 62 and 64 to ground, thereby rendering the transistor normally conductive.

The base of the transistor $Q_8$ receives the color killer voltage developed at terminal 52 in FIG. 2. Its collector is coupled to the junction between resistors 62 and 64 for turning the transistor $Q_9$ off in response to a color killer voltage of a predetermined low level.

When a relatively strong chroma signal is received by the receiver, the killer voltage is high enough to maintain the transistor $Q_8$ in its normally off condition. By virtue of the regenerative feedback arrangement between transistors $Q_8$ and $Q_9$, the latter transistor is normally on to generate a collector current in a lead 66. The current in the lead 66 is coupled to the collector of a transistor $Q_{10}$ which may be considered part of the further chroma amplifier 58. With the collector and base of transistor $Q_{10}$ coupled together and to the base of another transistor $Q_{11}$, the current in the lead 66 is mirrored in the collector lead 68 of the transistor $Q_{11}$. The latter lead may be coupled to a differential amplifier 70 for supplying a D.C. operating current thereto. When current is received via the lead 68, the differential amplifier 70 amplifies a chroma input signal received from terminal 72 and applies the amplified chroma signal to a chroma output terminal 74. Hence, the current generated in lead 68 by the transistor 66 effectively supplies operating current to the differential amplifier 70. When that current is quenched by the color killer, the differential amplifier 70 is turned off.

When the received chroma signal disappears or decreases to a predetermined low level, the color killer voltage decreases sufficiently to turn on the transistor 56. The resultant collector current of transistor $Q_8$ passes through the resistor 64 to ground, wherefore a more positive voltage is developed at the base of the transistor $Q_9$. The transistor $Q_9$ begins turning off and the transistor $Q_8$ conducts more heavily. Ultimately, the transistor $Q_9$ is turned completely off by this regenerative action and all the available emitter current from the resistor 60 flows through the transistor $Q_8$.

With the illustrated arrangement, the turn off and turn on points of the color killer are different so that a few d.b. (decibels) of hysteresis are provided. In a preferred embodiment, the resistors 62 and 64 are selected such that the received color signal must decrease from nominal by about 30 d.b. to turn the color killer off and must rise about 2 d.b. above the kill point to turn the color killer back on to supply operating current to the chroma amplifier 58. With such hysteresis, flashing on and off of color is prevented as the color component of a received broadcast signal varies slightly above and below the color kill point.

One of the advantages of the above-described color killer is that it is actuated by a kill voltage that decreases toward ground as the chroma signal decreases in amplitude. Hence, the kill point of the color killer is far removed from the supply voltage. In addition, the color killer voltage must decrease by a fairly large amount from nominal, 4.5 volts, for example, before actuation of the color killer. Hence, the color killer is not particularly sensitive to noise which which may be present in the color killer voltage.

Another advantage of the color killer is that it consumes very little power and is, therefore, quite suitable for construction in integrated circuit form.

Although the invention has been described in terms of a preferred structure, it will be obvious to those skilled in the art that many alterations and modifications may be made to the illustrated embodiment without departing from the invention. All such modifications and alterations are deemed to be within the spirit and scope of the invention as defined by the appended claims.

What is claimed is:

1. In a color television receiver, a chroma amplifier and color killer, comprising:
   first and second emitter-coupled transistors receiving a current source having a D.C. operating component and an A.C. chroma signal component;
   third and fourth emitter-coupled transistors receiving a current source having only a D.C. operating component substantially equal to the D.C. operating component received by the first and second transistors;
   means for coupling a variable ACC voltage and a substantially fixed D.C. bias voltage to selected base terminals of said transistors such that said first transistor develops an A.C. chroma signal output at its collector whose amplitude is controlled by the ACC voltage, and said fourth transistor develops a D.C. output signal which includes substantially no A.C. component and whose amplitude varies with variations in the ACC voltage;
   a D.C. actuated color killer; and
   means for coupling said D.C. output voltage to said color killer.

2. A chroma amplifier and color killer as set forth in claim 1 wherein the ACC voltage is applied to the bases of said first and fourth transistors and the D.C. bias voltage is applied to the bases of said second and third transistors.

3. A chroma amplifier and color killer as set forth in claim 2 wherein said ACC voltage is filtered to remove high frequency components, wherein said bias input voltage may include noise components, and wherein the collector output of said first transistor is coupled with the collector output of said third transistor to provide an A.C. chroma output signal in which ACC-induced D.C. variations are cancelled and in which amplified noise from the bias voltage appears in opposite, cancelling polarities.

4. A chroma amplifier and color killer as set forth in claim 2 wherein the collector current of said fourth transistor increases with increases in gain of said first transistor, and further including means for converting the increasing current of said fourth transistor to a corresponding, decreasing color killer voltage, and wherein said color killer is adapted to be actuated when said color killer voltage reaches a predetermined low level.

5. A chroma amplifier and color killer as set forth in claim 4 wherein said color killer is adapted to supply operating current to a further chroma amplifier and to terminate said operating current when the color killer voltage reaches said predetermined low level.

6. A chroma amplifier and color killer as set forth in claim 4 wherein said color killer includes a pair of emitter-coupled transistors, one of which is biased normally on to supply operating current via its collector to the further chroma amplifier, and the other of which is biased normally off but responsive to said color killer voltage for turning on so as to regeneratively reduce beyond cut-off the bias on said one transistor for terminating the flow of operating current to the further chroma amplifier.

7. In a color television receiver, a chroma amplifier and color killer, comprising:
- first and second emitter-coupled transistors receiving a source current which includes a D.C. operating current and an A.C. chroma signal current;
- means for coupling to the base of said first transistor an ACC voltage which is filtered to remove noise and high frequency components;
- means for coupling to the base of said second transisor a D.C. bias voltage which may include noise components;
- third and fourth emitter-coupled transistors receiving a source current which includes only a D.C. operating current of substantially the same amplitude as the D.C. operating current received by said first and second transistors;
- means for coupling said ACC voltage to the base of said fourth transistor;
- means for coupling said D.C. bias voltage to the base of said third transistor so that said fourth transistor develops a D.C. output signal which includes substantially no A.C. component and whose amplitude varies with variations in the ACC voltage;
- means for combining a collector output of said first transistor with a collector output of said third transistor so that an AC chroma output signal is developed whose amplitude is controlled by the ACC voltage, which includes substantially no ACC-induced D.C. variations, and in which amplified noise from the bias voltage appears in opposite, cancelling polarities;
- a D.C. actuated color killer adapted to normally supply operating current to a further chroma amplifier; and
- means for coupling said D.C. output signal to said color killer so that said color killer terminates the operating current supplied to the further chroma amplifier when said D.C. output signal reaches a predetermined level.

8. A chroma amplifier and color killer as set forth in claim 7 wherein the collector current of said fourth transistor increases with increases in gain of said first transistor, and further including means for converting the increasing current of said fourth transistor to a corresponding, decreasing color killer voltage, and wherein said color killer is adapted to be actuated when said color killer voltage reaches a predetermined low level.

9. A chroma amplifier and color killer as set forth in claim 8 wherein said color killer includes a pair of emitter-coupled transistors, one of which is biased normally on to supply operating current via its collector to the further chroma amplifier, and the other of which is biased normally off but responsive to said color killer voltage for turning on so as to regeneratively reduce beyond cut-off the bias on said one transistor for terminating the flow of operating current to the further chroma amplifier.

10. In a color television receiver having a color killer and a chroma amplifier, the latter comprising first and second emitter-coupled transistors and third and fourth emitter-coupled transistors interconnected and adapted to receive and amplify a chroma input signal, the improvement comprising:
- means for supplying a first current source to the emitters of the first and second transistors, said first current source including a D.C. operating current and an A.C. chroma current;
- means for applying a variable, filtered ACC voltage to the base of the first transistor;
- means for supplying a D.C. bias voltage which may include noise to the base of the second transistor;
- means for supplying a second current source to the emitters of the third and fourth transistors, said second current source including only a D.C. operating current substantially equal in magnitude to the D.C. operating current supplied to the first and second transistors; means coupling said D.C. bias voltage to the base of the third transistor;
- means coupling the ACC voltage to the base of said fourth transistor such that the fourth transistor develops a D.C. output signal for control of the color killer, which output signal includes substantially no A.C. component and whose amplitude varies with variations in the ACC voltage; and
- means coupling the collector of the first transistor to the collector of the third transistor to provide an ACC-controlled chroma output-signal having a substantially constant D.C. level and in which amplified noise from said bias voltage appears in opposite, cancelling polarities.

* * * * *